April 13, 1926.　　　　W. J. METZGER ET AL　　　1,580,623
　　　　　　　　　　　　　　CAR COUPLER
　　　　　　　　　　Filed April 4, 1924　　　6 Sheets-Sheet 4

April 13, 1926.  1,580,623
W. J. METZGER ET AL
CAR COUPLER
Filed April 4, 1924   6 Sheets-Sheet 5

INVENTORS
William J. Metzger and
BY Archibald J. Kirkpatrick
Clarence Hern
ATTORNEY April 13, 1926.

W. J. METZGER ET AL 1,580,623

CAR COUPLER

Filed April 4, 1924    6 Sheets-Sheet 6

INVENTORS
William J. Metzger and
BY Archwood J. Karbulick,
Clarence B. Kero
ATTORNEY Patented Apr. 13, 1926.

1,580,623

UNITED STATES PATENT OFFICE.

WILLIAM JOSEPH METZGER AND ARCHWOOD JOHN KASHUBECK, OF CLEVELAND, OHIO, ASSIGNORS TO NATIONAL MALLEABLE AND STEEL CASTINGS COMPANY, OF CLEVELAND, OHIO, A CORPORATION OF OHIO.

CAR COUPLER.

Application filed April 4, 1924. Serial No. 704,114.

*To all whom it may concern:*

Be it known that we, WILLIAM JOSEPH METZGER and ARCHWOOD JOHN KASHUBECK, citizens of the United States, residing at Cleveland, Cuyahoga County, Ohio, have jointly invented new and useful Improvements in Car Couplers, of which the following is a specification, reference being had to the accompanying drawings, in which—

Figure 1:
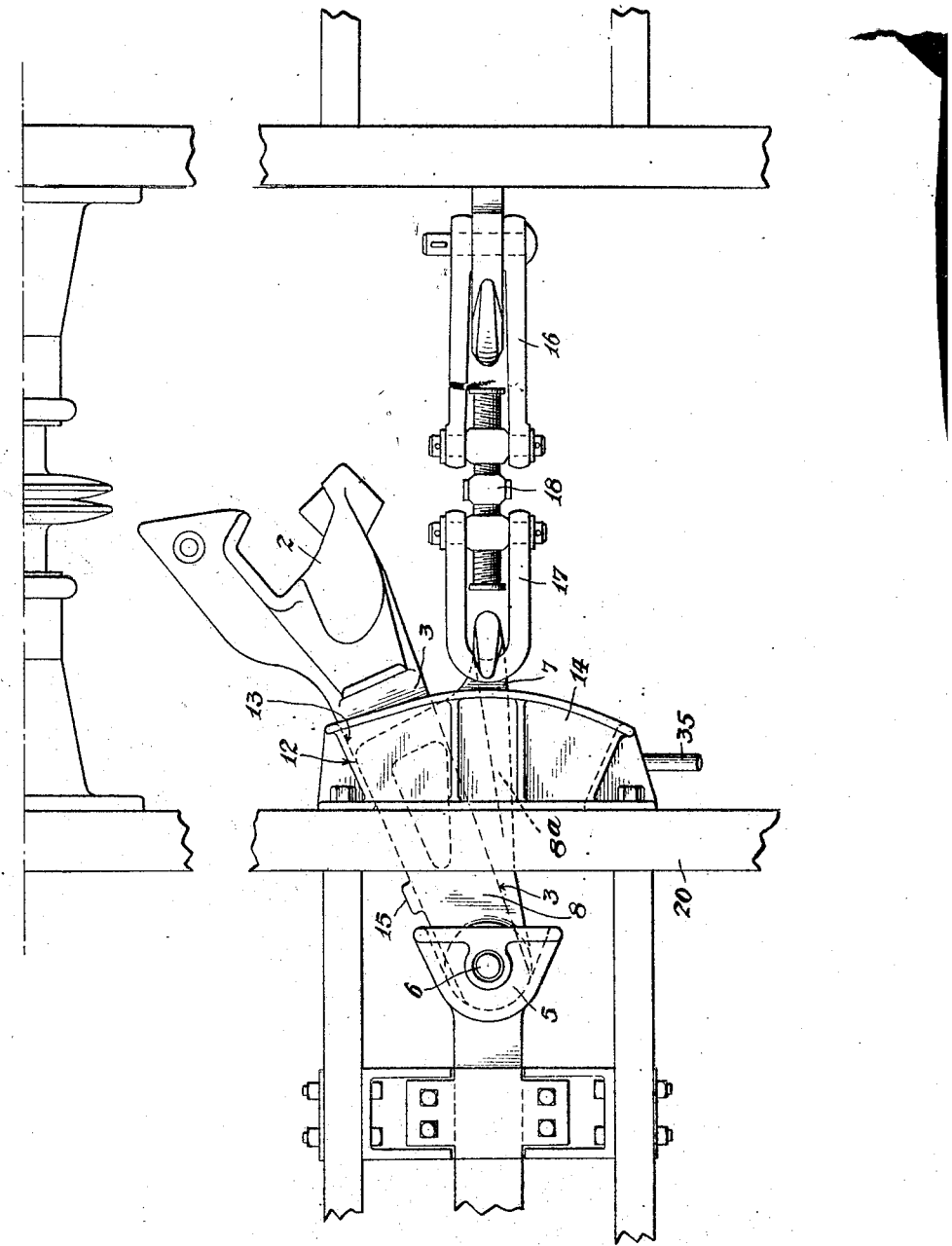
Figure 2:
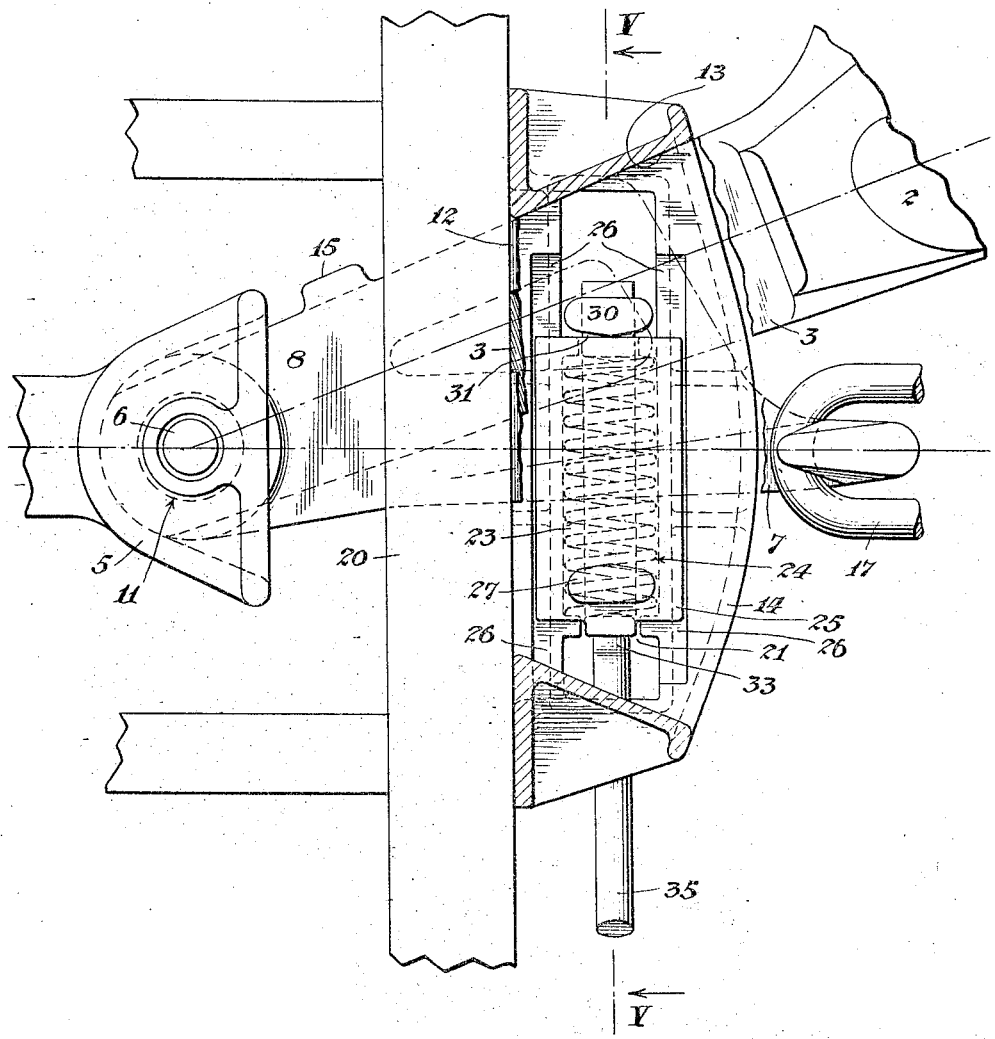
Figure 3:
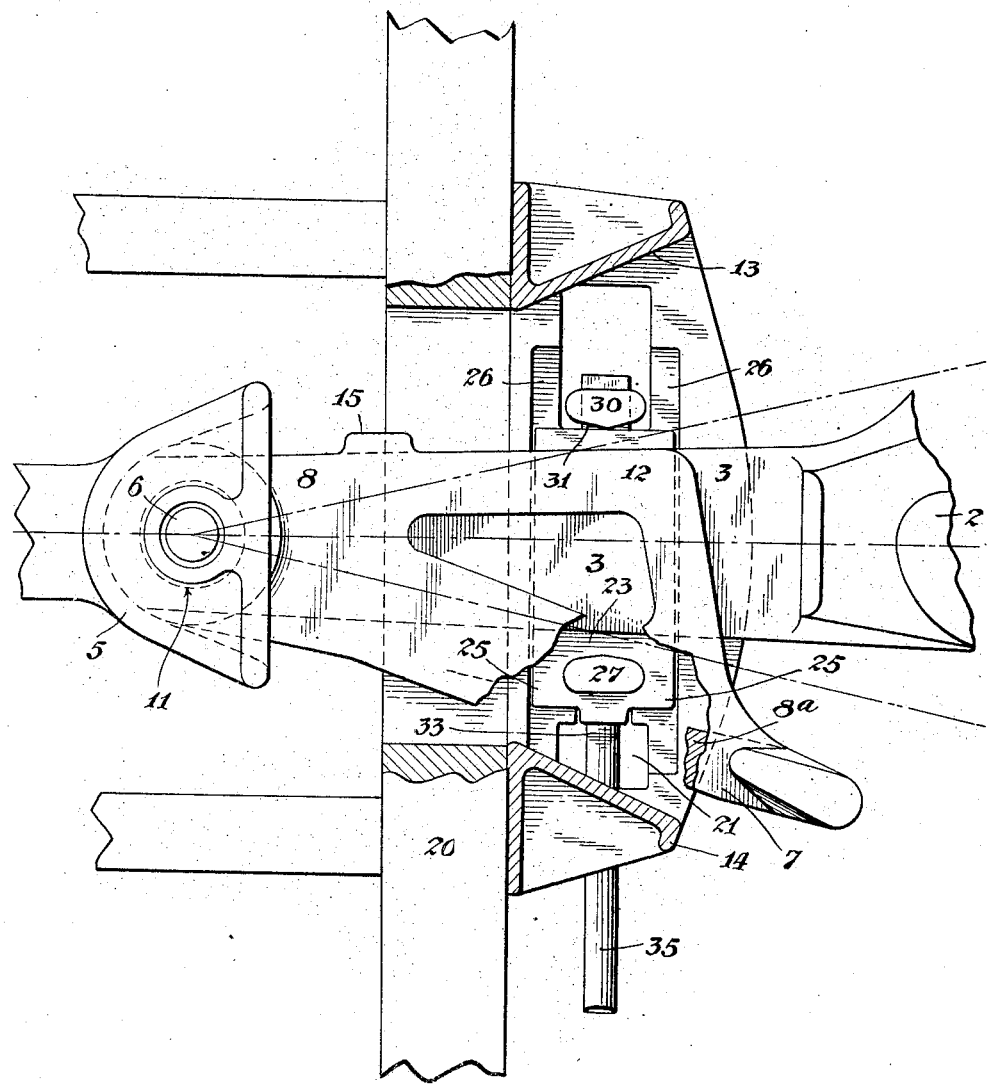
Figure 4:
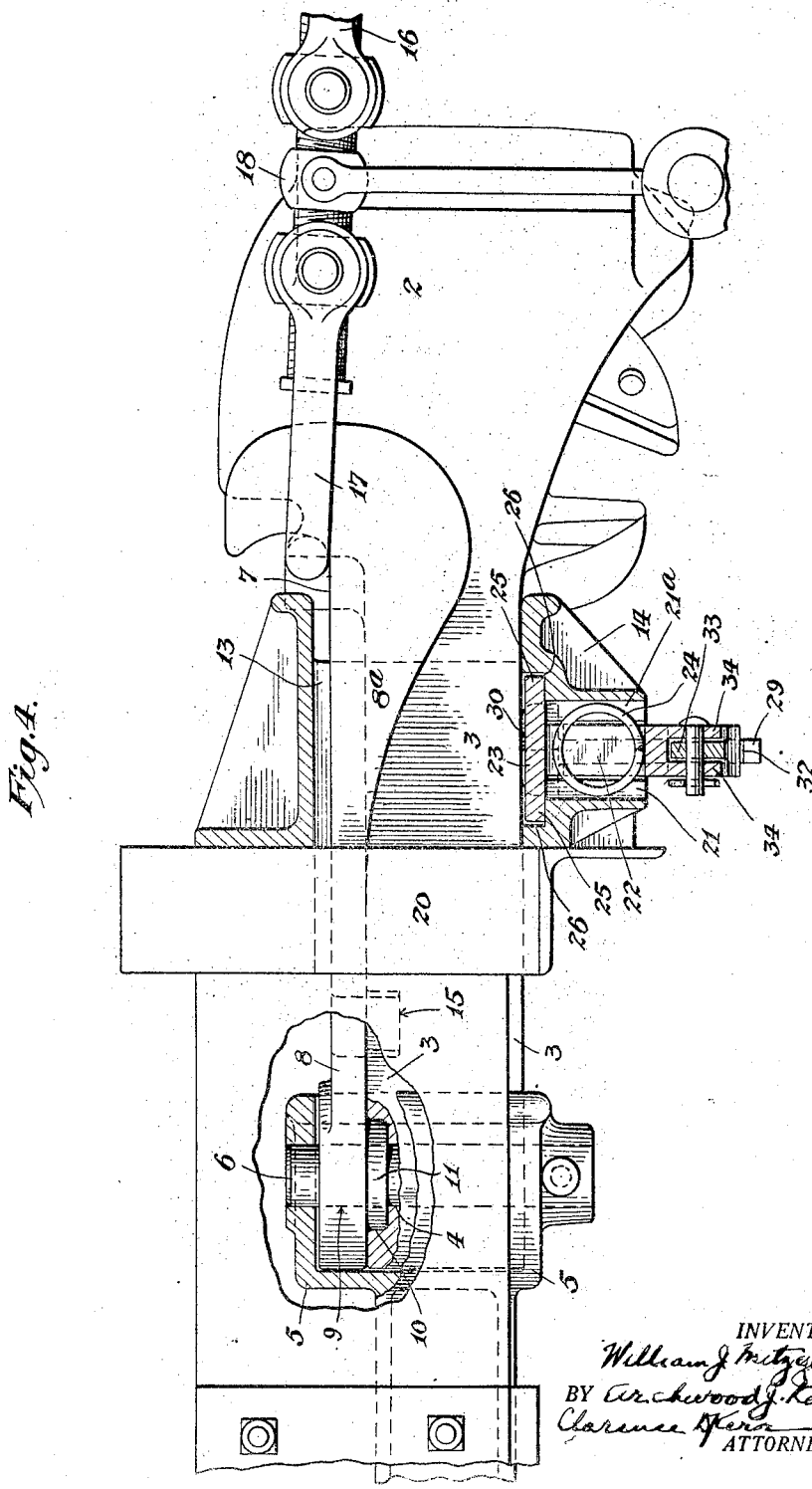
Figure 5:
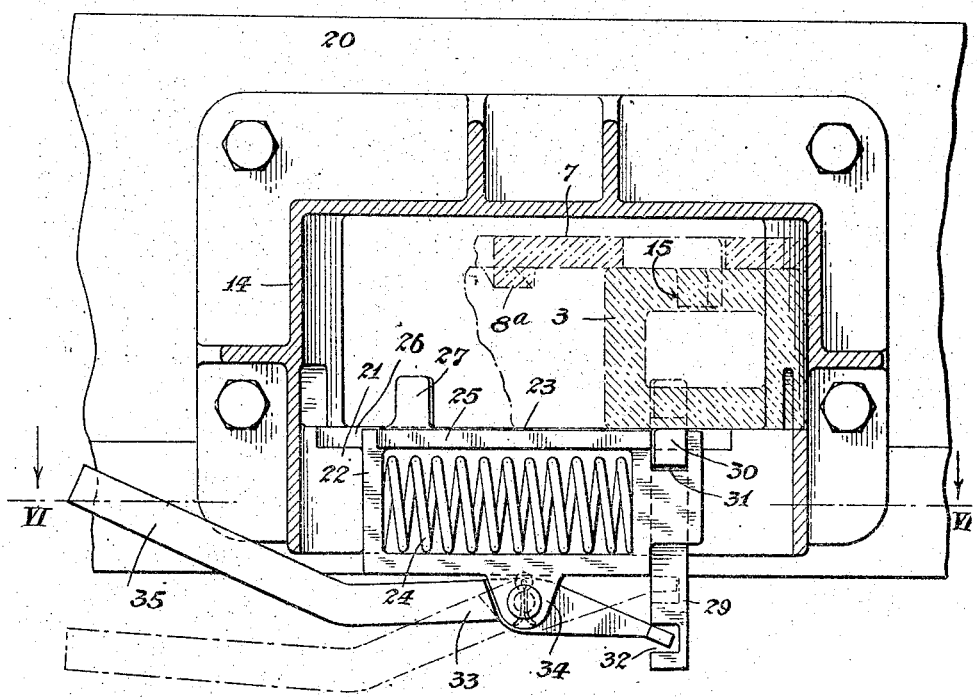
Figure 6:
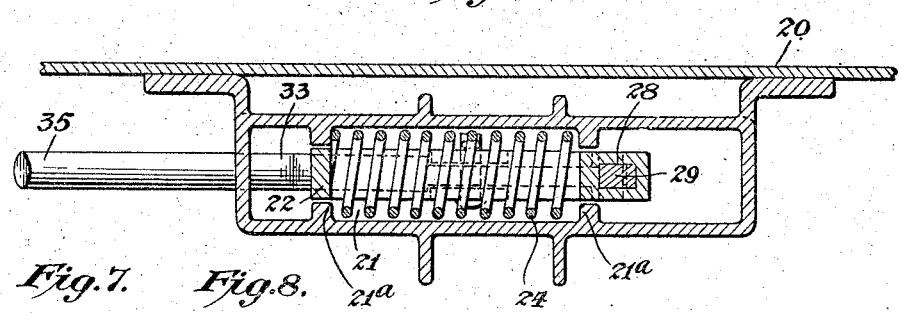
Figures 7, 8:
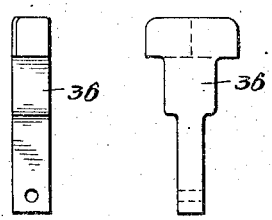
Figure 9:
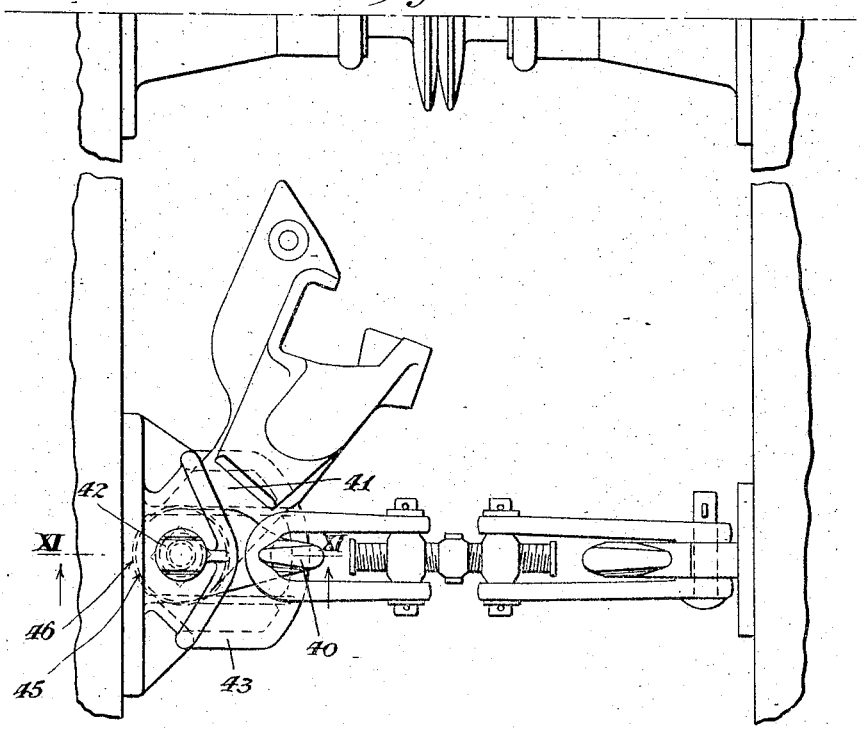
Figure 10:
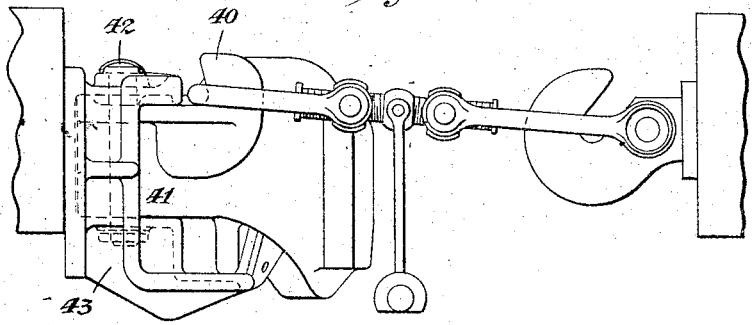
Figure 11:
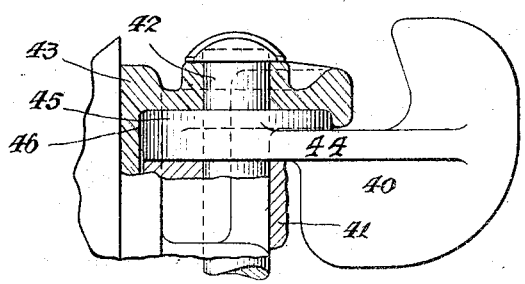

Fig. 1 is a plan showing the application of automatic and hook couplers embodying our invention to the framing of a car, the hook coupling being coupled to a like coupler mounted on the framing of an adjacent car; Fig. 2 is an enlarged detail plan, partly in section, with the couplers in the same relative position as in Fig. 1; Fig. 3 is a view similar to Fig. 2, but with the automatic coupling in coupling position; Fig. 4 is a side elevation, partly in section, with the parts in the position shown in Fig. 1; Fig. 5 is a section on lines V—V of Fig. 2; Fig. 6 is a horizontal section on line VI—VI of Fig. 5; Figs. 7 and 8 are details of a stop intended to be used to replace the movable stop after the transition period is over; and Figs. 9, 10 and 11 are, respectively, plan, elevation and detail of a hook of a modified form of our invention, Fig. 11 being a section on lines XI—XI of Fig. 9.

Our invention relates to car couplers, and is particularly designed to provide means for permitting railway vehicles equipped with automatic couplers to be coupled with other vehicles provided with couplers of other types, such as of the draw-hook and side buffer type. To this end we have provided a transitional or supplemental coupling device which is attached to the same securing means as the automatic coupler and is so arranged that either the transition device or the automatic coupler may be easily swung into or out of operative position and thereby be ready for coupling with an automatic coupler of the same type or with a draw-hook arrangement or other form of coupler. Our invention also provides a simple and compact means whereby the automatic coupler may be maintained within the automatic coupling range by a centering device, and at the same time provision may be made for a free lateral swing within the automatic coupling range of the automatic coupler.

Our invention also contains provision that when the transitional coupling is in use the automatic centering means shall be rendered inoperative and remain inoperative until the automatic coupling is again moved back into its coupling range. Our invention also comprises the various features which we shall hereinafter describe and claim.

Referring to the drawings, 2 indicates an automatic coupler of the rigid jawed type such as is described in Letters Patent No. 1,201,665, dated October 17, 1916, to John Willison, the rearwardly extending shank 3 of which has near its rear end a vertical aperture 4 by which the coupler is secured to a draft casting 5 by a pivot pin 6.

The transitional member comprises a hook member 7 which is located at one side and slightly to the rear of the coupler head 2, so that when the automatic coupler is in use the hook 7 is entirely out of the way. The hook 7 has a rearwardly extending plate or shank 8 which bears on top of the automatic coupler shank 3 and at its rear end has an aperture 9 by which it is secured to the upper end of the pivot pin 6. The shank 8 also has a depending reinforcing rib 8ª which merges into the hook 7 and engages, or is engaged by, the shank 3 of the automatic coupler as the hook moves to the left, or the automatic coupler moves to the right, according to Fig. 1. In order to provide a substantial pulling bearing on the pivot pin 6 the coupler shank 3 has in its top surface a recess 10 about the aperture 4 and concentric with the axis of the pivot pin 6. The rear end of the shank of the transitional member has a correspondingly shaped boss 11 which fits into the recess 10 in the automatic coupler shank 3 and thus forms an interlock between the hook shank 8 and the automatic coupler shank 3. As the recess 10 and boss 11 are concentric, this permits the hook 7 to swing freely toward and from the coupler 2. The hook shank 8 also has a lateral extension 12 which bears against the side wall 13 of the opening in the carrier casting 14, and thus serves to keep the hook 7 properly spaced from the coupler head 2. The hook shank 8 has a downward projection 15 which engages the side of the automatic coupler shank 3 opposite that on which the hook 7 is positioned, so that when the automatic coupler is pushed over to the non-operative position shown in Figs. 1, 2, 4 and 5 the coupler shank 3 engages such projection 15 and pulls the transition hook 7 to its proper position in line with the center of the vehicle, ready to be coupled to a like coupling.

In Figs. 1, 2, 4 and 5 we have shown the hook coupling employed for coupling with a vehicle equipped with a non-automatic coupler such as the coupling 16 of the draw-hook type, in which event the coupling is connected to the hook 7 by the shackle 17 and slack adjuster 18.

If desired, a coupler centering device may be provided to return the coupler to the normal coupling range when the coupler has been carried beyond such range by movement around curves of the vehicle on which the coupler is mounted. A coupler centering device suitable for the foregoing purpose is shown in the carrier casting 14, which is secured to the end sill 20 of the vehicle. The carrier 14 has in its bottom a transverse slot 21 in which the depending portion 22 of the yoke 23 seats. Mounted within the yoke 23 and extending in the direction of the length of the slot 21 is a spring 24 which bears against the ends of the yoke 23 and also against the ends of the slot 21. The yoke 23 is appreciably shorter than the slot 21 and is free, except for the spring 24, to move in either direction.

Movement of the yoke 23 in either direction will therefore compress the spring 24 between an end of the yoke 23 and one of the shoulders 21ª of the slot 21, and thus when connected to the automatic coupler tends to keep the coupler within its automatic coupling range.

The upper portion of the yoke 23 has horizontally extending flanges 25 which engage shoulders 26 at either side of the slot 21. The shoulders 26 are so depressed below the floor of the opening in the carrier 14 that the top surface of the yoke 23 is substantially flush with the floor of the opening in the casting. Extending upwardly from the top of the yoke and at one end thereof is a coupler shank engaging projection 27. At its other end the yoke has a vertically extending socket 28 for reception of the stem 29 of a movable coupler shank engaging stop 30, preferably of T-shape, which is arranged to slide freely up and down in the socket 28. The stop 30 is preferably spaced away from the projection 27 a distance not only sufficient to permit the coupler shank 3 to be received between them, but also to provide room for the movement of the coupler unrestrained by the centering device within the limits of the automatic coupling range. The upper part of the socket 28 has its sides cut away at 31 to permit the head of the stop 30 to be lowered so that its top surface will not project above the upper surface of the yoke 23. The stop 30 at the lower end of its stem 29 has a notch 32 in the side thereof for the reception of the end of an operating lever 33 which is pivoted between ears 34 depending from the bottom of the yoke 23. The opposite end of the lever 33 terminates in a conveniently located handle portion 35.

When it is desired to connect the automatic coupler with the coupler centering mechanism, the coupler 2 is swung over to bring its shank 3 into engagement with the projection 27. As soon as the shank has cleared the stop 30, the weight of the handle 35, by reason of the fact that the end of the lever 33 seats in the notch 32, will push the stop 30 up into position to engage the side of the shank 3 opposite that which has engaged the projection 27. Thereafter, when the coupler is moved laterally in either direction beyond the automatic coupling range, the centering device will be actuated either by the projection 27 or the stop 30 against the pressure of the spring 24, which, as already explained, will tend, when it is compressed, to force the coupler back into its coupling range.

When it is desired to disconnect the automatic coupler and the centering mechanism, for instance, to bring the transition hook 7 into use, the handle 35 of the lever 33 is lifted and this causes the stop 30 to be pulled down into the socket 28 with its head in the cut away portion 31 of the socket. The coupler 2 may then be pushed by hand over into the position shown in Figs. 1 and 2. If the operating handle 35 is then released, the stop 30 will be held from rising by the bottom of the coupler shank 3, as is shown in Fig. 5.

After the transition period is over, a post transition stop 36, shown in Figs. 7 and 8, may be substituted for the stop 30. There will then be no need for a notch in the stem of the stop or for the lever 33, which may accordingly be eliminated.

We have shown in Figs. 9, 10 and 11 a modified form of transition hook particularly adapted for engine couplers. In this form of our invention the transition hook coupling 40 is supported upon the top of the automatic coupler shank 41 and has a pulling engagement with the pivot pin 42 by which both couplers are secured to the engine pocket 43.

The hook shank 44 has at its rear end an upwardly extending boss 45 which, when the parts are assembled, seats in a recess 46 in the top of the coupler pocket 43 so as to provide a direct pulling engagement between the hook and pocket and thereby relieve the pin 42 from some of the pulling stresses.

The terms and expressions which we have employed are used as terms of description and not of limitation, and we have no intention, in the use of such terms and expressions, of excluding any mechanical equivalents of the features shown and described, or portions thereof, but recognize that various structural modifications are possible within the scope of the invention claimed.

What we claim is:

1. In coupling mechanism, unlike and alternatively used couplers pivotally attached to a common pivot pin arranged to transmit stresses to a railway vehicle therethrough, one of said couplers being supported by the other, and one of said couplers having a recess, and projection engagement whereby that portion of the pivot pin directly engaged by the said coupler is relieved of a part of the direct pulling stresses.

2. In coupling mechanism, unlike and alternatively used couplers pivotally attached to a common pivot pin arranged to transmit stresses to a railway vehicle therethrough, one of said couplers being supported by the other, each of said couplers being capable of lateral movement independent of the other, and one of the couplers having means whereby both couplers may move in unison.

3. In coupling mechanism, unlike and alternatively used couplers arranged to transmit stresses to a railway vehicle through a common pivot pin, each coupler when in coupling position being arranged to hold the other in non-coupling position, one of said couplers being an automatic coupler movable laterally when used with a like coupler, a coupler centering device having means for connecting with the automatic coupler, said means comprising a stop arranged to be projected automatically into engagement with the said coupler, whereby extreme lateral movement of the said coupler will be controlled.

4. In coupling mechanism, unlike and alternatively used couplers arranged to transmit stresses to a railway vehicle through a common pivot pin, each coupler when in coupling position being arranged to hold the other in non-coupling position, one of said couplers being an automatic coupler movable laterally during coupling operations with a like coupler, a coupler centering device connected to the said coupler, the centering device comprising a spring contained in a movable yoke mounted on the frame of the vehicle, coupler shank engaging abutments connected with said yoke, one of said abutments being movable to permit the disconnection of the centering device from the automatic coupler when the other coupler is in use.

WILLIAM JOSEPH METZGER.
ARCHWOOD JOHN KASHUBECK.